(12) United States Patent
Graetz et al.

(10) Patent No.: US 7,781,102 B2
(45) Date of Patent: Aug. 24, 2010

(54) HIGH-CAPACITY NANOSTRUCTURED GERMANIUM-CONTAINING MATERIALS AND LITHIUM ALLOYS THEREOF

(75) Inventors: Jason A. Graetz, Upton, NY (US);
Brent T. Fultz, Pasadena, CA (US);
Channing Ahn, Pasadena, CA (US);
Rachid Yazami, Los Angeles, CA (US)

(73) Assignees: California Institute of Technology, Pasadena, CA (US); Centre National de la Recherche Scientifique (C.N.R.S.), Paris (FR)

( * ) Notice: Subject to any disclaimer, the term of this patent is extended or adjusted under 35 U.S.C. 154(b) by 983 days.

(21) Appl. No.: 10/829,598

(22) Filed: Apr. 22, 2004

(65) Prior Publication Data

US 2010/0190059 A1 Jul. 29, 2010

(51) Int. Cl.
*H01M 4/36* (2006.01)
*H01M 6/18* (2006.01)
*H01M 4/00* (2006.01)

(52) U.S. Cl. .................. 429/226; 429/128; 429/322

(58) Field of Classification Search .................. None
See application file for complete search history.

(56) References Cited

U.S. PATENT DOCUMENTS

| | | | |
|---|---|---|---|
| 3,536,532 A | 10/1970 | Wantanabe et al. | |
| 3,956,018 A | 5/1976 | Kozawa | |
| 4,119,655 A | 10/1978 | Hulme | |
| 4,346,152 A * | 8/1982 | Sammells et al. ........... | 429/112 |
| 4,431,567 A | 2/1984 | Gestaut et al. | |
| 5,114,811 A | 5/1992 | Ebel et al. | |
| 5,175,066 A | 12/1992 | Hamwi et al. | |
| 6,334,939 B1 | 1/2002 | Zhou et al. .................. | 204/409 |
| 6,358,649 B1 | 3/2002 | Yazami et al. | |
| 6,649,033 B2 | 11/2003 | Yagi et al. | |
| 6,713,214 B2 | 3/2004 | Koga et al. | |
| 6,743,547 B2 | 6/2004 | Gan et al. | |
| 6,844,115 B2 | 1/2005 | Gan et al. | |
| 6,852,446 B2 | 2/2005 | Barbarich | |
| 2002/0048705 A1 | 4/2002 | Park et al. | |
| 2002/0123183 A1* | 9/2002 | Fitzgerald ................... | 438/199 |
| 2003/0013019 A1* | 1/2003 | Barker et al. ............. | 429/231.9 |

(Continued)

FOREIGN PATENT DOCUMENTS

EP 0776053 5/1997

(Continued)

OTHER PUBLICATIONS

Hashimoto et al, Preparation of Li4.4GexSi1-x alloys by mechanical milling process and their properties as anode materials in all-solid-state lithium batteries, Aug. 5, 2004, Elsevier, Solid State Ionics 175, pp. 177-180.*

(Continued)

*Primary Examiner*—Robert Hodge
(74) *Attorney, Agent, or Firm*—Greenlee Sullivan P.C.

(57) ABSTRACT

Electrodes comprising an alkali metal, for example, lithium, alloyed with nanostructured materials of formula $Si_zGe_{(z-1)}$, where $0<z\leq1$; formula $Si_zGe_{(z-1)}$, where $0<z<1$; and/or germanium exhibit a combination of improved capacities, cycle lives, and/or cycling rates compared with similar electrodes made from graphite. These electrodes are useful as anodes for secondary electrochemical cells, for example, batteries and electrochemical supercapacitors.

21 Claims, 12 Drawing Sheets

U.S. PATENT DOCUMENTS

| | | | |
|---|---|---|---|
| 2003/0054252 A1* | 3/2003 | Kusumoto et al. | 429/231.95 |
| 2003/0165697 A1* | 9/2003 | Saitoh et al. | 428/446 |
| 2004/0106741 A1* | 6/2004 | Kriesel et al. | 525/329.5 |
| 2004/0258997 A1* | 12/2004 | Utsugi et al. | 429/232 |
| 2005/0227146 A1 | 10/2005 | Ghantous | |

FOREIGN PATENT DOCUMENTS

| | | | |
|---|---|---|---|
| EP | 1028476 | | 8/2000 |
| WO | 0196847 | | 12/2001 |
| WO | 0203430 | | 1/2002 |
| WO | WO 03/073535 | * | 9/2003 |
| WO | 2004025757 | | 3/2004 |
| WO | 2005004204 | | 1/2005 |

OTHER PUBLICATIONS

K. Sayama, H. Yagi, Y. Kato, S. Matsuta, H. Tarui, and S. Fujitani, Abstract 52; The 11th International Meeting on Lithium Batteries, Monterey, CA, Jun. 23-28, 2002.

T. Takamura, S. Ohara, J. Suzuki, and K. Sekine, Abstract 257, The 11th International Meeting on Lithium Batteries, Monterey, CA, Jun. 23-28, 2002.

Li, et al., "A High Capacity Nano-Si Composite Anode Material for Lithium Rechargeable Batteries" Electrochemical and Solid-State Letters, 2 (11) 547-549 (1999).

Ohara, et al., "Li Insertion/Extraction Reaction at a Si Film Evaporated on a Ni Foil" Journal of Power Sources 119-121 (2003) 591-596.

Graetz, et al., "Highly Reversible Lithium Storage in Nanostructured Silicon, Electrochemical and Solid-State Letters" 6 (9) A194-A197 (2003).

D. Shneyder, "Two-Dimensional Oxidation of SiGe" 69-71, http://www.nnf.cornell.edu/1999REU/ra/Shneyder.pdf.

Arora and Zhang, Oct. 13, 2004, "Battery Separators," Chem. Rev., 104:4419-4462.

Charlier et al., 1993, "First principles study of graphite monofluoride $(CF)_n$," Phys. Rev. B, 47:16162-16168.

Davidson, 2003, "Lithium Batteries, Molecular Expressions, Electricity and Magnetism," Florida State Univ., http://micro.magnet.fsu.edu/electromag/electricity/batteries/lithium.html.

Ebert et al., 1974, "Carbon monofluoride. Evidence for a structure containing an infinite array of cyclohexane boats," J. Am. Chem Soc., 96:7841-7842.

Fujimoto, 1997, "Structure analysis of graphite fluoride by Rietveld method," Carbon, 35:1061-1065.

Gupta et al., 2001, "Raman scattering study of highly fluorinated graphite," J. Fluorine Chem., 110:145-151.

International Search Report Corresponding to PCT/US 2003/28395, Mailed Feb. 8, 2005.

Jacobs, Lithium battery basics, Machine Design, www.machinedesign.com/ASP/strArticleID/55501/strSite/MDSite/view Selected Art.asp, Downloaded Oct. 14, 2005.

Jacobs, "Long-lasting lithiums," Electron. Comm Technol., http://dataweek/co.za/Article.ASP?pklArticleID=1847&pklIssueID=455, Downloaded Oct. 14, 2005.

Kita et al., 1979, "Chemical composition and crystal structure of graphite fluoride," J. Am. Chem. Soc., 101:3832-3841.

Li, et al., 2000, "The crystal structural evolution of nano-Si anode caused by lithium insertion and extraction at room temperature," Solid State Ionics, 135:181-191.

Mitkin et al., 2002, "X-ray photoelectron and Auger spectroscopic study of superstoichiometric fluorographite-like materials," J. Struct. Chem., 43:843-855.

Nakajima et al., 1999, "Electrochemical behavior of surface-fluorinated graphite," Electrochem. Acta, 44:2879-2888.

Nanse et al., 1997, "Fluorination of carbon blacks: an x-ray photoelectron spectroscopy study: I. A literature review of XPS studies of fluorinated carbons. XPS investigation of some reference compounds," Carbon, 35:175-194.

Pelikan et al., 2003, "On the structural and electronic properties of poly(dicarbon monofluoride): solid-state semi-empirical INDO study," J. Solid State Chem., 174:233-240.

Pilarzyk, "Lithium carbon monofluoride coin cells in real-time clock and memory backup applications," Rayovac, White Papers, http://www.rayovac.com/technical/wp_lithium.htm, Downloaded Oct. 17, 2005.

Touhara et al., 1987, "On the structure of graphite fluoride," Anorg. All. Chem., 544:7-20.

Whittingham, 1975, "Mechanism of reduction of fluorographite cathode," J. Electrochem. Soc., 122:526-527.

Zajac et al., 2000, "The structure and properties of graphite monofluoride using the three-dimensional cyclic cluster approach," J. Solid State Chem., 150:286-293.

Zhou, et al., 1999, "Controlled Li doping of Si nanowires by electrochemical insertion method," Applied Physics Letters, 75(16):2447-2449.

Author (Unknown), "Meeting the energy need of future warriors," National Academic Press, www.nap.edu/openbook/0309092612/html/91.html, Downloaded Oct. 14, 2005.

Author (Unknown), "Meeting the energy need of future warriors," National Academic Press, www.nap.edu/openbook/0309092612/html/88.html, Downloaded Oct. 14, 2005.

Author (Unknown), "Lithium Batteries," Panasonic Ideas for Life, Product brochure, www.panasonic.com/industrial/battery/oem/chem/lith/index.html, Downloaded Oct. 14, 2005.

Author (Unknown), PowerStream Battery Chemistry FAQ, PowerStream Technology, www.powerstream.com/BatteryFAQ.html, Last Updated Aug. 17, 2003.

Lam et al. (Jun. 27, 2005) "Physical Characteristics and Rate Performance of $(CFx)_n$ ($0.33<x<0.66$) in Lithium Batteries," J. Power Sources: 153:354-359.

International Search Report Corresponding to PCT/US 05/37871, Mailed Apr. 19, 2006.

Search Report for Corresponding International PCT Application, PCT/US2005/013268, Mailed Apr. 7, 2006.

Office Action Corresponding to U.S. Appl. No. 10/660,382, filed Sep. 10, 2003.

Maranchi et al. (Web Release Jul. 15, 2003) "High Capacity, Reversible Silicon Thin-Film Anodes for Lithium-Ion Batteries," Electrochem. Solid-State Lett. 6(9):A198-A201.

Ahn et al. (2001) "Mechanically Milled Nanocrystalline $Ni_3Sn_4$ and $FeSi_2$ Alloys as an Anode Material for Li-ion Batteries," Journal of Metastable and Nanocrystalline Materials, vol. 10, pp. 595-602.

Bourderau et al. (1999) "Amorphous silicon as a possible anode material for Li-ion batteries," J. Power Sources, 81-82:233-236.

Gao et al. (2001) "Alloy Formation in Nanostructured Silicon," Advanced Materials, vol. 13 No. 11, pp. 816-819.

Huang et al. (1999) "Electrochemical characteristics of $Sn_{1-x}Si_xO_2$ as anode for lithium-ion batteries," J. Power Sources, 81-82:362-367.

Huggins (1998) "Lithium alloy negative electrodes formed from convertible oxides," Solid State Ionics, 113-115:57-67.

Kim et al. (2001) "Effect of Si addition to thin-film $SnO_2$ microbattery anodes on cycling performance," J. Power Sources, 101:253-258.

Yang et al. (2002) "$SiO_x$-based anodes for secondary lithium batteries," Solid State Ionics, 152-153:125-129.

Graetz, J. et al. (2004) "Nanocrystalline and Thin Film Germanium Electrodes with High Lithium Capacity and High Rate Capabilities," Journal of the Electrochemical Society, vol. 151(5), pp. A698-A702.

* cited by examiner

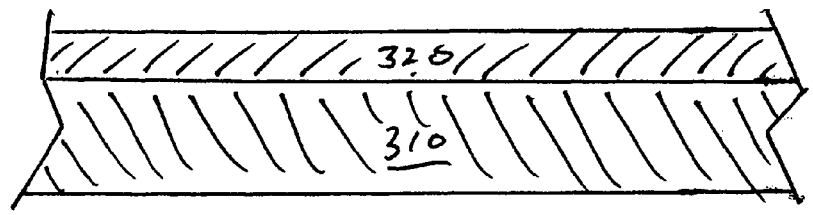
FIG. 3A
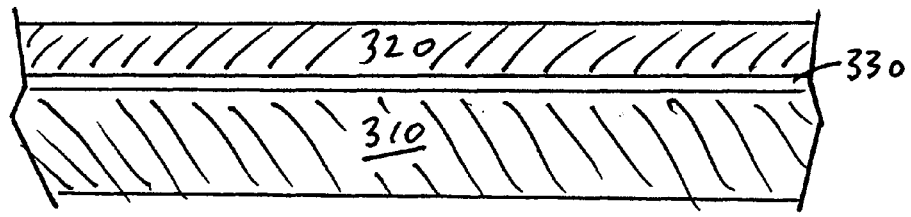
FIG. 3B
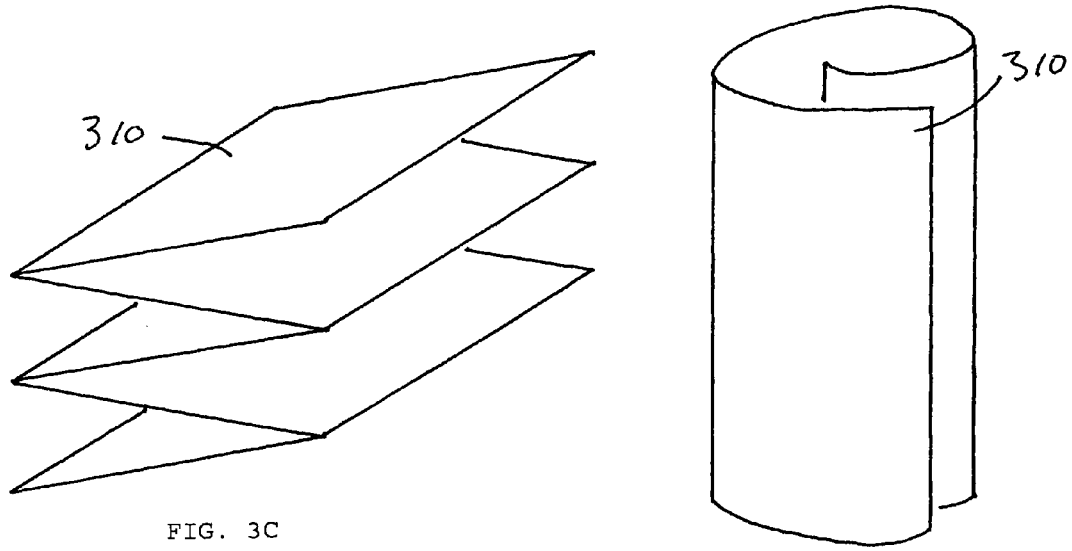
FIG. 3C
FIG. 3D

HIGH-CAPACITY NANOSTRUCTURED GERMANIUM-CONTAINING MATERIALS AND LITHIUM ALLOYS THEREOF

STATEMENT REGARDING FEDERALLY SPONSORED RESEARCH OR DEVELOPMENT

Some aspects of this disclosure were made with the support of the Department of Energy of the U.S. Government through Basic Energy Sciences Grant No. DE-FG03-00ER15035. The U.S. Government may have certain rights in the invention.

BACKGROUND OF THE INVENTION

1. Field of the Invention

The present application relates generally to the fabrication of secondary electrochemical cells, and more particularly, of nanostructured germanium-containing materials and alkali metal alloys thereof, all of which are useful as electrodes in secondary electrochemical cells.

2. Description of the Related Art

Batteries are used to power electrical devices that are not easily powered by a fixed power source, for example, portable electronics and spacecraft. Certain applications, for example, electric vehicles, are limited by the energy capacities of available rechargeable batteries, which are also referred to herein as secondary electrochemical cells.

Among the secondary electrochemical cells with the highest energy capacities are lithium batteries, which use lithium anodes. Commercially available lithium ion batteries typically use graphite-based anodes into which the lithium intercalates. The theoretical maximum stoichiometry of a graphitic anode is $LiC_6$, which translates into a specific capacity of about 372 mAh/g. In certain cases, solvent cointercalation in the graphite anodes reduces the storage capacity from the theoretical value.

The energy density in a lithium ion battery may be increased by increasing the density of lithium in the anode, for example, by using a metallic lithium anode. Metallic lithium presents safety issues, however, which restrict metallic lithium anodes in secondary batteries to small cells. Moreover, cells with metallic lithium anodes tend to have limited lifetimes. Recharging a discharged or "dead" cell electroplates lithium onto the anode, which tends to grow as dendrites in a cell with a metallic lithium anode. In many cases, the lithium dendrites bridge between the anode and cathode of the cell, thereby creating an internal short circuit in the battery, which renders the battery unusable.

As noted above, lithium ion batteries typically use lithium-graphite anodes. The graphite acts as a framework material into which the lithium atoms can reversibly enter and exit, thereby controlling the electrode geometry or shape as the cell is recharged, and consequently, preventing dendritic growth. This framework material reduces the specific or gravimetric capacity of the electrode, however. Consequently, an ideal framework material has both low density and high lithium capacity.

An attractive framework material is silicon. Lithium-silicon alloys have low operating voltages versus lithium (~300 mV), and large theoretical energy densities (up to 4200 mAh/g for $Li_{4.4}Si$). A 300% volume increase accompanies fully lithiating silicon, however, resulting in mechanical stresses that pulverize the material within a few charge/discharge cycles. Moreover, slow lithium transport kinetics limit these anodes to medium and high temperature cells using molten electrolytes.

Nanostructured silicon and lithium-silicon alloys display improved room temperature cycle life compared to bulk-silicon electrodes. Examples of such materials are disclosed in copending U.S. patent application Ser. No. 10/660,382, filed on Sep. 10, 2003; S. Bourderau, T. Brousse, and D. M. Schleich, *J. Power Sources,* 81:233-236, 1999; H. Li, X. Huang, L. Chen, Z. Wu, and Y. Liang, *Electrochem. Solid State Lett.,* 2:547-549, 1999; G. W. Zhou, H. Li, H. P. Sun, D. P. Yu, Y. Q. Wang, X. J. Huang, L. Q. Chen, and Z. Zhang, *Appl. Phys. Lett.,* 75:2447-2449, 1999; J. Graetz, C. C. Ahn, R. Yazami, and B. Fultz, *Electrochem. Solid State Lett.,* 6:A194-A197, 2003; and S. Ohara, J. Suzuki, K. Sekine, and T. Takamura, *J. Power Sources,* 119-121:591-596, 2003, the disclosures of which are incorporated by reference.

On exposure to oxygen, silicon forms a native oxide (silicon dioxide, $SiO_2$) on its surface, which reduces the overall capacity of a silicon electrode, however. In the initial charging cycle for this type of electrode, the lithium reduces the silicon oxide, forming $Li_2O$ and elemental silicon, thereby resulting in a large irreversible capacity for the first cycle, as well as reducing the gravimetric capacity of the material. In a nanostructured material, the high surface to volume ratio means that native oxide accounts for a significant fraction of the silicon atoms in the material.

SUMMARY OF THE INVENTION

Electrodes comprising an alkali metal, for example, lithium, alloyed with nanostructured materials of formula $Si_{(1-z)}Ge_z$, where $0<z\leq 1$, exhibit a combination of improved capacities, cycle lives, and/or cycling rates compared with similar electrodes made from graphite. These electrodes are useful as anodes for secondary electrochemical cells, for example, batteries and electrochemical supercapacitors.

Some embodiments provide a nanostructured material of formula $Si_{(1-z)}Ge_z$, where $0<z\leq 1$, and/or an alkali metal alloy thereof. Other embodiments provide a method for synthesizing a nanostructured material of formula $Si_{(1-z)}Ge_z$, where $0<z\leq 1$, and/or an alkali metal alloy thereof.

Other embodiments provide an electrode comprising a nanostructured material of formula $Si_{(1-z)}Ge_z$, where $0<z\leq 1$, and/or an alkali metal alloy thereof. Other embodiments provide a method for manufacturing an electrode comprising a nanostructured material of formula $Si_{(1-z)}Ge_z$, where $0<z\leq 1$, and/or an alkali metal alloy thereof.

Other embodiments provide a secondary electrochemical cell comprising an anode, a cathode, and an electrolyte, wherein the anode comprises a nanostructured material of formula $Si_{(1-z)}Ge_z$, where $0<z\leq 1$, and/or an alkali metal alloy thereof. Other embodiments provide a method for manufacturing a secondary electrochemical cell comprising an anode, a cathode, and an electrolyte, wherein the anode comprises a nanostructured material of formula $Si_{(1-z)}Ge_z$, where $0<z\leq 1$, and/or an alkali metal alloy thereof.

In some embodiments, the alloy is produced by electrochemically alloying an alkali metal, for example lithium, with a nanostructured framework material of formula $Si_{(1-z)}Ge_z$, where $0<z\leq 1$. In some embodiments, the alkali metal is lithium. In some embodiments, an electrode fabricated from the nanostructured framework material reversibly alloys with and releases lithium on charging and discharging, respectively. Some embodiments of these electrodes exhibit improvements in any one of or some combination of charge capacity, cycle life, or cycling rate. Some embodiments of the disclosed electrode are useful as an anode in a secondary electrochemical cell.

Still other embodiments provide electrodes comprising an alkali metal, for example, lithium, alloyed with a nanostructured germanium material, which exhibit a combination of improved capacities, cycle lives, and/or cycling rates compared with similar electrodes made from graphite. These electrodes are useful as anodes for secondary electrochemical cells, for example, batteries and electrochemical supercapacitors.

Some embodiments provide a nanostructured germanium material, and/or an alkali metal alloy thereof. Other embodiments provide a method for synthesizing a nanostructured germanium material, and/or an alkali metal alloy thereof.

Other embodiments provide an electrode comprising a nanostructured germanium material, and/or an alkali metal alloy thereof. Other embodiments provide a method for manufacturing an electrode comprising a nanostructured germanium material, and/or an alkali metal alloy thereof.

Other embodiments provide a secondary electrochemical cell comprising an anode, a cathode, and an electrolyte, wherein the anode comprises a nanostructured germanium material, and/or an alkali metal alloy thereof. Other embodiments provide a method for manufacturing a secondary electrochemical cell comprising an anode, a cathode, and an electrolyte, wherein the anode comprises a nanostructured germanium material, and/or an alkali metal alloy thereof.

In some embodiments, the alloy is produced by electrochemically alloying an alkali metal, for example lithium, with a nanostructured germanium framework material. In some embodiments, the alkali metal is lithium. In some embodiments, an electrode fabricated from the nanostructured framework material reversibly alloys with and releases lithium on charging and discharging, respectively. Some embodiments of these electrodes exhibit improvements in any one of or some combination of charge capacity, cycle life, or cycling rate. Some embodiments of the disclosed electrode are useful as an anode in a secondary electrochemical cell.

Yet other embodiments provide electrodes comprising an alkali metal, for example, lithium, alloyed with nanostructured materials of formula $Si_{(1-z)}Ge_z$, where $0<z<1$, which exhibit a combination of improved capacities, cycle lives, and/or cycling rates compared with similar electrodes made from graphite. These electrodes are useful as anodes for secondary electrochemical cells, for example, batteries and electrochemical supercapacitors.

Some embodiments provide a nanostructured material of formula $Si_{(1-z)}Ge_z$, where $0<z<1$, and/or an alkali metal alloy thereof. Other embodiments provide a method for synthesizing a nanostructured material of formula $Si_{(1-z)}Ge_z$, where $0<z<1$, and/or an alkali metal alloy thereof.

Other embodiments provide an electrode comprising a nanostructured material of formula $Si_{(1-z)}Ge_z$, where $0<z<1$, and/or an alkali metal alloy thereof. Other embodiments provide a method for manufacturing an electrode comprising a nanostructured material of formula $Si_{(1-z)}Ge_z$, where $0<z<1$, and/or an alkali metal alloy thereof.

Other embodiments provide a secondary electrochemical cell comprising an anode, a cathode, and an electrolyte, wherein the anode comprises a nanostructured material of formula $Si_{(1-z)}Ge_z$, where $0<z<1$, and/or an alkali metal alloy thereof. Other embodiments provide a method for manufacturing a secondary electrochemical cell comprising an anode, a cathode, and an electrolyte, wherein the anode comprises a nanostructured material of formula $Si_{(1-z)}Ge_z$, where $0<z<1$, and/or an alkali metal alloy thereof.

In some embodiments, the alloy is produced by electrochemically alloying an alkali metal, for example lithium, with a nanostructured framework material of formula $Si_{(1-z)}Ge_z$, where $0<z<1$. In some embodiments, the alkali metal is lithium. In some embodiments, an electrode fabricated from the nanostructured framework material reversibly alloys with and releases lithium on charging and discharging, respectively. Some embodiments of these electrodes exhibit improvements in any one of or some combination of charge capacity, cycle life, or cycling rate. Some embodiments of the disclosed electrode are useful as an anode in a secondary electrochemical cell.

BRIEF DESCRIPTION OF THE DRAWINGS

FIG. 3A-FIG. 3D illustrate embodiments of nanostructured framework materials on a substrate.

DETAILED DESCRIPTION OF THE PREFERRED EMBODIMENTS

Figure 1:
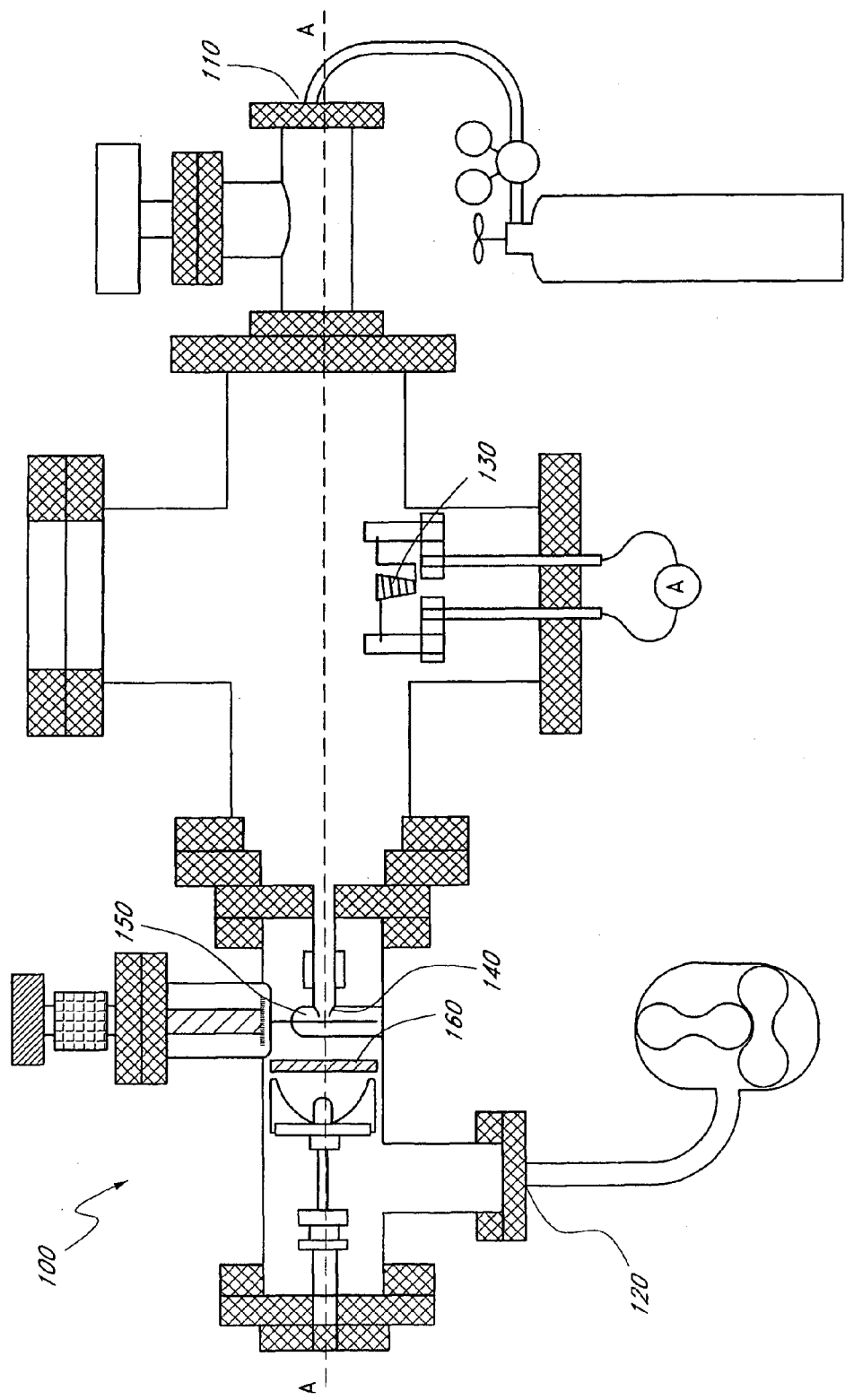
FIG. 1 is a schematic of the gas-phase ballistic consolidation chamber used to synthesize germanium nanocrystals.

As used herein, the term "electrode" is used in its ordinary meaning. The term "electrode" when used in conjunction with a material includes electrodes comprising the material, as well as electrodes during and after a charge and/or discharge cycle, unless otherwise specified, either explicitly or by context. For example, the term "germanium electrode"

includes a germanium electrode as well as a lithium-germanium electrode formed by electrochemical alloying with lithium. The term "battery" is used in its ordinary meaning, as well as to refer to both an electrochemical cell as well as an electrochemical battery. The term "secondary electrochemical cell" is used in its ordinary meaning, and also to mean "battery" and "electrochemical supercapacitor." A secondary electrochemical cell typically comprises an anode, a cathode, and an electrolyte. An electrochemical supercapacitor is an electrical storage device comprising electrodes and an electrolyte, which is typically capable of high charge and discharge rates. Charges are typically stored in a "double layer" at the electrode/electrolyte interface. Electrochemical supercapacitor electrodes typically use high active-surface-area materials, for example, carbons and metal oxides. The present disclosure also includes combinations of secondary electrochemical cells in series and/or in parallel as batteries and/or supercapacitors.

A battery comprises a negative electrode (anode), a positive electrode (cathode) and an electrolyte. On discharge, electrons travel from the anode to the cathode through an external circuit in response to electrochemical reactions at the electrodes. When the battery is charged, an externally applied voltage induces the reverse electrochemical reactions at each electrode.

A supercapacitor is an electrical energy storage cell in which ions are stored on or near the surfaces of the electrodes. Associated with each stored ion is a stored electric charge (an electron or a hole) that neutralizes the total charge at the surface of an electrode. Accordingly, supercapacitors are also referred to as electrochemical double-layer capacitors. On discharge, ions stored at the surfaces migrate into the electrolyte and the associated electric charges are released to an external circuit, thereby providing an electric current. Compared to batteries, supercapacitors typically store less energy per weight, but typically charge and discharge in much shorter time scales.

As used herein, the term "framework material" refers, in general, to a material into which an electrochemically active species reversibly enters and exits, and in particular, to the germanium-containing materials disclosed herein, as well as mixtures thereof, which may also include impurities formed during charging and/or discharging, for example, alkali metal oxides (e.g., lithium oxide) and/or alkali metals (e.g., lithium). Other properties of the disclosed framework material are discussed in greater detail below.

Disclosed herein are a nanostructured germanium-containing material and alkali metal alloys thereof that are useful as electrodes in secondary electrochemical cells. Secondary electrochemical cells comprising some embodiments of the disclosed electrodes exhibit improved properties compared with similar cells fabricated with graphite electrodes, for example, energy density, cycle life, and/or rate capabilities. Some embodiments of the disclosed electrodes are useful in fabricating electrochemical cells or batteries on an integrated device, for example, a microprocessor, memory device, identification tag, or the like. Some embodiments of the disclosed electrodes are useful in fabricating electrochemical supercapacitors.

In some embodiments, the germanium-containing material is germanium. In other embodiments, the germanium-containing material is silicon-germanium. Some embodiments of the nanostructured germanium-containing material demonstrate improved charge/discharge cycle life in a lithium electrochemical cell compared with a bulk electrode made from a material of similar chemical composition. On charging, nanostructured Material electrochemically alloys with lithium from the electrolyte. This process is also referred to herein as "lithiation." In some embodiments, the alloy is lithium-germanium (Li—Ge). In other embodiments, the alloy is lithium-silicon-germanium (Li—Si—Ge). On discharging, the lithium alloy releases lithium into the electrolyte. In certain embodiments, the lithiation and/or reverse reaction occurs at ambient temperature. Some embodiments of the nanostructured germanium-containing material are useful in electrochemical cells of other alkali metals, for example, sodium, potassium, rubidium, and cesium. Accordingly, also disclosed herein is an electrochemically synthesized alloy of alkali metals with the disclosed nanostructured material, and in particular, lithium-germanium and lithium-silicon-germanium alloys.

Germanium

The use of nanostructured germanium as a framework material for alkali-metal secondary electrochemical cells remains relatively unexplored. The Li—Ge system has a theoretical capacity of 1.6 Ah/g ($Li_{4.4}Ge$), which is about 40% of the theoretical gravimetric capacity of Li—Si. In contrast to silicon, germanium does not appreciably form native oxide. Consequently, the first charging cycle does not exhibit a large irreversible capacity arising from reduction of native oxide. For some nanostructured electrode applications, the absence of native oxide makes germanium superior to silicon despite the lower theoretical capacity. Elemental germanium is presently expensive compared with silicon; however, germanium is an abundant element and the current price likely reflects a lack of demand rather than scarcity or difficulty in isolation and/or purification.

An additional advantage of germanium over silicon is the greater diffusivity of lithium in germanium, which is approximately 15 times greater at 360° C. ($2.14 \times 10^{-7}$ $cm^2$/sec for Ge and $1.47 \times 10^{-8}$ $cm^2$/sec for Si), as disclosed in C. S. Fuller and J. C. Severiens, *Phys. Rev.* 96:21-24, 1954, the disclosure of which is incorporated by reference. Applying these values to the empirical equation for the diffusion coefficient provided in Eq. 1:

$$D = D_0 e^{-Q/RT} \qquad \text{Eq. 1}$$

where T is the temperature, Q is the activation energy, and $D_0$ is a constant prefactor, suggests that the diffusivity of lithium in germanium is expected to be over 400 times greater than that of lithium in silicon at room temperature.

In some embodiments, the nanostructured germanium is substantially pure germanium, for example, greater than about 90%, greater than about 95%, greater than about 98%, greater than about 99%, greater than about 99.9%, greater than about 99.99%, greater than about 99.999%, or greater than about 99.9999% pure. In other embodiments, the germanium is doped. The dopant is any known dopant compatible with the conditions in the secondary electrochemical cell. Examples of suitable dopants include, without limitation, boron, arsenic, antimony, and phosphorus. In some embodiments, the germanium includes impurities.

Silicon-Germanium

Silicon and germanium form alloys or solid solutions of continuously variable stoichiometry of formula $Si_{(1-z)}Ge_z$, where $0 \leq z \leq 1$. Silicon-germanium-lithium alloys are believed to have a maximum theoretical lithium stoichiometry of $Li_{4.4}(Si_{(1-z)}Ge_z)$, providing materials with maximum gravimetric capacities between that of pure silicon and pure germanium. Moreover, in some embodiments, silicon-germanium alloys in which z is greater than about 0.5 exhibit reduced native oxide compared with pure silicon under ambient atmosphere and temperature. Consequently, certain embodiments of silicon-germanium alloys in which z is greater than about 0.5 provide a higher gravimetric capacity than pure germanium, yet do not form appreciable native oxide.

In some embodiments, the nanostructured silicon-germanium is substantially pure silicon-germanium, for example, greater than about 90%, greater than about 95%, greater than about 98%, greater than about 99%, greater than about 99.9%, greater than about 99.99%, greater than about 99.999%, or greater than about 99.9999% pure. In other embodiments, the silicon-germanium is doped. The dopant is any dopant compatible with the conditions in the secondary electrochemical cell. Examples of suitable dopants include, without limitation, boron, arsenic, antimony, and phosphorus. In some embodiments, the silicon-germanium includes impurities, for example, silicon dioxide. In some embodiments, the silicon-germanium is substantially homogeneous. In some embodiments, the silicon-germanium is not homogeneous, for example, in some embodiments, the stoichiometry of the silicon-germanium is not uniform, either within a single structure and/or between different structures.

In some embodiments, the nanostructured germanium or silicon-germanium is crystalline. In other embodiments, the nanostructured germanium or silicon-germanium is amorphous. In still other embodiments, the nanostructured germanium or silicon-germanium has both crystalline and amorphous domains.

As used herein, the term "framework material" includes both the disclosed germanium and silicon-germanium materials. In some embodiments, the framework material is in the form of particles, also referred to herein as "nanoparticles." In certain embodiments, the diameter of a particle is not greater than about 300 nm, 290 nm, 280 nm, 270 nm, 260 nm, 250 nm, 240 nm, 230 nm, 220 nm, 210 nm, 200 nm, 190 nm, 180 nm, 170 nm, 160 nm, 150 nm, 140 nm, 130 nm, 120 nm, 110 nm, 100 nm, 90 nm, 80 nm, 70 nm, 60 nm, 50 nm, 40 nm, 30 nm, 20 nm, 10 nm, 5 nm, 2 nm, or 1 nm. In some preferred embodiments, the particle is not greater than about 50 nm, not greater than about 20 nm, or not greater than about 10 nm. The nanoparticles are present as individual particles, clusters of particles, or a combination thereof. The nanoparticles are synthesized by any means known in the art, for example, by grinding or milling, by solution synthesis, by physical vapor deposition, or by chemical vapor deposition. In some embodiments, the particles are synthesized by "inert gas condensation and ballistic consolidation," which is also referred to herein as "ballistic consolidation," and which is described in greater detail below. In some embodiments, the nanoparticles are amorphous. In some embodiments, the nanoparticles are crystalline. In some embodiments, the nanoparticles are partially crystalline. In embodiments in which the nanoparticles are crystalline or partially crystalline, the particles are also referred to as "nanocrystals." Nanocrystals are single crystals and/or polycrystalline. In some embodiments, the nanoparticles comprise a mixture of amorphous nanoparticles and/or nanocrystals.

In some embodiments, clusters of the nanocrystalline framework material are produced by inert gas condensation and ballistic consolidation in a deposition chamber 100 illustrated in FIG. 1. The apparatus is constructed from materials known in the art that are compatible with the processing conditions, for example, stainless steel, quartz, fluorocarbon elastomers, and the like. The illustrated device comprises a gas inlet port 110 and a gas outlet port 120 disposed at opposite ends of the elongate deposition chamber 100. Together, the inlet port 110 and outlet port 120 create a pressure differential along axis A-A. The inlet port 110 is fluidly connected to a gas source. The outlet port 120 is in fluid connection with a vacuum source. Preferably, the vacuum source is a high vacuum source, for example, capable of evacuating the deposition chamber 100 to about 100 mtorr. In one embodiment, the pressure differential is controllable, for example, by controlling the gas source and/or vacuum source using means known in the art. In a preferred embodiment, the vacuum source has a capacity sufficient to accommodate any desired gas flow, and the pressure differential is controlled by adjusting the gas pressure.

The apparatus further comprises a heating basket 130 downstream from the inlet port 110, which is configured to receive a charge of the material to be deposited. Between the heating basket 130 and outlet port 120 and along axis A-A are disposed a nozzle 140, a shutter 150, and a substrate 160.

The heating basket 130 is of any type known in the art, for example, a resistively heated tungsten wire basket. The nozzle 140 is configured to accelerate the gas forced through by the pressure gradient, and consequently, to accelerate entrained particles to close to the speed of sound. The shutter 150 has an open position and a closed position. In the open position, the gas stream and entrained particles impinge on the substrate 160. The shutter is of any type known in the art, for example, a gate valve. The shutter 150 is typically in the open position throughout the disclosed nanocrystal synthesis and deposition process. The substrate 160 is any substrate onto which the deposition of the nanocrystalline germanium is desired, and is discussed in greater detail below.

Figure 2:
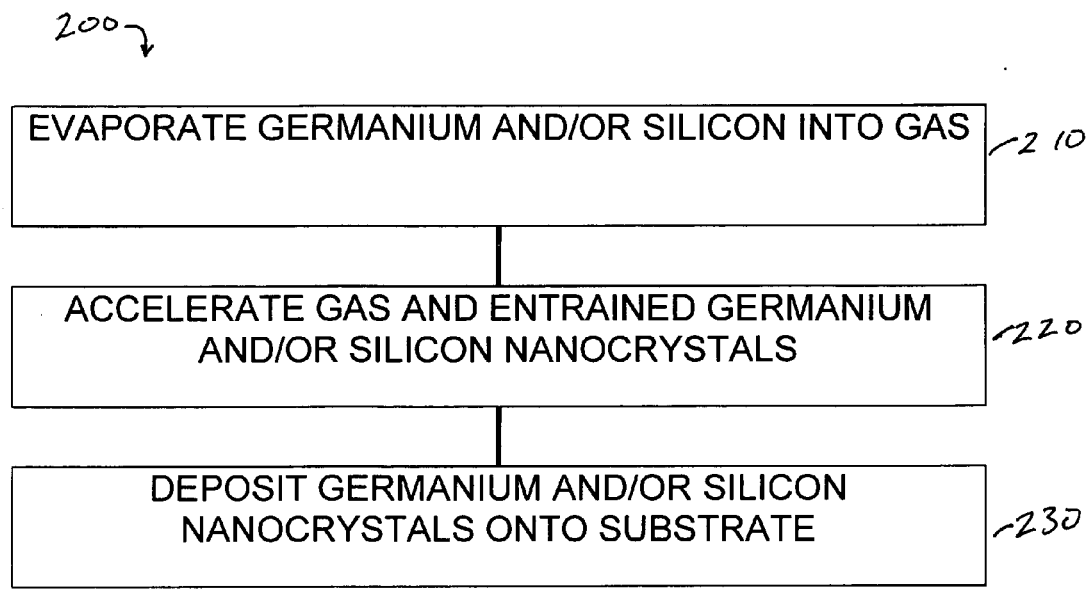
FIG. 2 illustrates an embodiment of a method for synthesizing germanium and/or silicon-germanium nanocrystals.

A method 200 for synthesizing framework material nanocrystals using the apparatus 100 is illustrated in FIG. 2. In step 210, a charge of a precursor to the framework material loaded in the heating basket 130 is heated, and evaporated into a gas in the deposition chamber 100. In some embodiments, the precursor is germanium, silicon-germanium, silicon and germanium, or a combination thereof. A gas stream is generated by introducing the gas through inlet port 110 into the evacuated deposition chamber 100. The deposition chamber 100 is typically evacuated through the outlet port 120 using the attached vacuum source. The rate and pressure of the gas are adjusted to provide a gas stream with a predetermined pressure differential between the inlet port 110 and outlet port 120. The framework material atoms are cooled rapidly within the gas stream. Nanocrystal nuclei are formed in collisions between the cooled atoms. The nanocrystal nuclei move by Brownian motion in the gas stream, forming loose agglomerates. In step 220, the gas stream is accelerated in the nozzle 140 thereby accelerating the entrained nanocrystals to close to the speed of sound. In step 230, the nanocrystals are deposited on the substrate 160. As the particles impact the substrate at high speed, they form a thin film of ballistically consolidated nanocrystals.

In one embodiment, the gas is a "forming gas" comprising hydrogen ($H_2$). The forming gas may further comprise an inert gas, for example, nitrogen, helium, argon, or neon. In certain embodiments, the forming gas comprises up to about 20% hydrogen, from about 5% to about 15% hydrogen, or about 10% hydrogen, with all gas percentages by volume. In one embodiment, the remainder of the forming gas is an inert gas, preferably nitrogen and/or argon. It is believed that the hydrogen in the forming gas reduces the formation of native oxide on the nanocrystals.

In general, the size of the nanoparticle increases with increasing pressure in the high pressure region. In certain embodiments, the pressure is from about ½ torr to about 5 torr, from about 1 torr to about 4 torr, or from about 2 torr to about 3 torr. In a preferred embodiment, the pressure differential is about 2 torr.

In some embodiments, the precursor material in the heating basket 130 is elemental germanium, silicon-germanium, a mixture of elemental silicon and elemental germanium, or a combination thereof. In some embodiments in which the nanoparticles are doped, the heating basket is charged with a doped precursor material, a mixture of a precursor material and a dopant, or a combination thereof. The temperature of the heating basket 130 is adjusted to provide an acceptable evaporation rate of the precursor material. In certain embodiments the temperature is greater than about 1200° C., greater than about 1300° C., greater than about 1400° C., 1500° C., greater than about 1600° C., greater than about 1700° C., greater than about 1800° C., greater than about 1900° C., or greater than about 2000° C. In the illustrated apparatus, a temperature of about 1500° C. provides an evaporation rate for elemental germanium of about $10^{-5}$ g/cm$^2$/s.

In another embodiment, the nanostructured framework material is a film, also referred to herein as a "nanofilm." In certain embodiments, the thickness of the film is not greater than about 500 nm, 490 nm, 480 nm, 470 nm, 460 nm, 450 nm, 440 nm, 430 nm, 420 nm, 410 nm, 400 nm, 390 nm, 380 nm, 370 nm, 360 nm, 350 nm, 340 nm, 330 nm, 320 nm; 310 nm, 300 nm, 290 nm, 280 nm, 270 nm, 260 nm, 250 nm, 240 nm, 230 nm, 220 nm, 210 nm, 200 nm, 190 nm, 180 nm, 170 nm, 160 nm, 150 nm, 140 nm, 130 nm, 120 nm, 110 nm, 100 nm, 90 nm, 80 nm, 70 nm, 60 nm, 50 nm, 40 nm, 30 nm, 20 nm, 10 nm, 5 nm, 2 nm, or 1 nm. In certain embodiments, the nanofilm is not greater than about 250 nm, not greater than about 200 nm, not greater than about 150 nm, not greater than about 100 nm, or not greater than about 50 nm. Nanofilms may be synthesized by any means known in the art, for example, by physical vapor deposition, by chemical vapor deposition, by atomic layer deposition, or by molecular beam epitaxy. Those skilled in the art understand the formation of nanofilms on integrated devices. In some embodiments, the nanofilm is amorphous. In other embodiments, the nanofilm is crystalline. In some embodiments, the nanofilm is polycrystalline. In other embodiments, the nanofilm comprises both crystalline and amorphous domains.

Embodiments of the disclosed nanostructured electrodes exhibit large reversible electrochemical capacities. High capacities are expected from the phase diagrams of the Li—Ge and Li—Si—Ge systems. In some embodiments, the cycle lives and/or diffusion kinetics are superior to those observed in the bulk framework material, and are believed to arise from the nanostructured nature of the material. Some embodiments of the disclosed nanostructured electrodes exhibit theoretical $Li_x(Si_{(1-z)}Ge_z)$ stoichiometries in which x is at least about 4.5, 4, 3.5, 3, 2.5, 2, 1.5, and/or 1. In some embodiments, x is at least about 4.5, 4.4, 3.8, 3.75, 3.5, 2.25, 1.83, and/or 1. These stoichiometries correspond to capacities of about 1666, 1629, 1407, 1388, 1298, 833, 678, and 370 mAh/g for z=1, i.e., pure germanium. Cycle lives are stable over at least about 5, 10, 20, 30, 40, 50, 60, 70, 80, 90, 100, or greater cycles. Embodiments of the disclosed nanostructured electrodes exhibit rate capabilities of at least about 10 C, 20 C, 50 C, 100 C, 200 C, 300 C, 400 C, 500 C, 1000 C, 2000 C, 3000 C, or 5000 C while retaining useful capacities. For example, at 1000 C, some embodiments of the nanostructured electrodes exhibit gravimetric capacities of at least about 70% or about 60% of the stable capacity at 1 C. These high rate capacities permit the disclosed nanostructured germanium and/or silicon-germanium framework materials to be used in applications such as electrochemical supercapacitors.

Any material compatible with the conditions for the particular application is a suitable substrate for the disclosed nanostructured framework material. Exemplary electrodes useful in secondary electrochemical cells are illustrated in FIG. 3A through FIG. 3D. In the illustrated embodiments, the electrode 300 comprises a substrate 310 for the nanostructured-framework-material anode 320, and an optional binder or adhesive 330. In an embodiment illustrated in FIG. 3A, a nanostructured framework material 320 adheres to a substrate 310, thereby providing physical support for the framework material 320. In another embodiment illustrated in FIG. 3B, a binder and/or adhesive 330 is disposed between the nanostructured material 320 and the substrate 310. Suitable binders and/or adhesives are discussed in greater detail below. The substrate 310 has any suitable geometry. In some embodiments, the substrate 310 is planar, for example, a foil or film. In some embodiments, the substrate 310 has a large surface area, for example, a woven or non-woven fabric. In other embodiments, the substrate 310 has another shape, for example, corrugations, slits, or the like. In some embodiments, a substrate 310 is folded or rolled-up to provide a more compact electrode 300, for example, as illustrated in FIG. 3C and FIG. 3D, respectively. In some embodiments, the substrate 310 is not monolithic, for example, comprising particles, beads, rods, fibers, wafers, plates, and the like, which are macro or nanoscale. In some embodiments, the substrate 310 is flexible. In other embodiments, the substrate 310 is rigid.

In some embodiments, the substrate 310 also serves as a current collector. In these embodiments, the substrate 310 comprises an electrical conductor. In one embodiment, the substrate/current collector 310 is made from a metal, for example, titanium, iron, stainless steel, nickel, platinum, copper, and gold. In other embodiments, the substrate/current collector 310 is made from a conductive non-metal, for example, graphite, conductive carbon nanotubes, doped diamond, or a doped semiconductor. In still other embodiments, the substrate 310 is a current collector comprising both electrically conductive and electrically non-conductive regions. For example, an electrically conductive material may be formed or deposited on a non-conductive material. In other embodiments, the substrate 310 does not serve as a current collector. For example, in some embodiments, the current collector is applied to the nanostructured germanium electrode after deposition of the electrode on the substrate 310.

The capacity fade in certain embodiments of the nanostructured framework materials, for example germanium nanocrystal aggregates, is believed to arise from decohesion and/or poor conductivity between the aggregates and the current collector. Consequently, some embodiments of the disclosed nanostructured germanium electrodes comprise a composite of the nanostructured germanium and a binder and/or a conductive diluent (also referred to herein as a "binder/diluent"), which maintains coherence between the nanostructured germanium and/or the current collector. Suitable binders are well known in the art, and include poly(vinylidenefluoride) (PVDF), polytetrafluoroethylene (PTFE), styrene-butadiene rubber (SBR), and polyacrylates. Suitable conductive diluents include carbon black, graphite, carbon nanotubes, fullerenes, doped diamond, doped semiconductors, metal particles, or metal films. In one embodiment, the binder/diluent is a material that does not alloy lithium, for example, copper or silver. In another embodiment, the binder/diluent alloys or otherwise binds lithium, for example, graphite.

Some embodiments use a composite electrode, which comprises a nanostructured framework material, for example, germanium nanocrystals and/or silicon-germanium nanocrystals, in admixture with a binder/diluent. In other embodiments, the composite electrode comprises layers, strips, islands, or some other pattern of the nanostructured framework material embedded within a binder/diluent. In one embodiment, the composite electrode comprises alternating layers of nanostructured germanium and a binder/diluent, for example, a composite electrode comprising a predetermined number of layers of germanium nanofilms interleaved with copper nanofilms.

In another embodiment, the electrode does not contain a binder and/or a conductive diluent, for example, carbon black or graphite. In some cases adding a binder or conductive diluent reduces the specific capacity of the electrode.

In some embodiments, the nanostructured electrode further comprises an oxide. In some embodiments, the oxide is an outer layer that partially or completely covers the surface of the electrode. In some embodiments, the oxide is silicon dioxide ($SiO_2$). Pure silicon typically forms a 25 Å native oxide layer on its surface. Amorphous $SiO_2$ is also referred to herein as a-$SiO_2$. As discussed in greater detail below, in some embodiments, the oxide is an alkali metal oxide ($M_2O$), which in a lithium-ion secondary cell is $Li_2O$.

In the following Examples, the nanostructured framework materials were deposited on metallic current collectors, without binders or conductive diluents. Mechanistic interpretations and/or speculations concerning the observed properties of the disclosed electrodes are provided in certain parts of the disclosure. These interpretations and/or speculations are not limiting to the scope of the disclosure.

Control bulk germanium electrodes were prepared by crushing elemental germanium into a powder of particle size less than 38 μm. A binder of 10 wt. % polyvinylidene fluoride and a conductive diluent of 8 wt. % acetylene black were added to the powder to improve the cycling characteristics. The electrode powder was pressed into a pellet using a pressure of approximately 90 MPa.

The electrodes were cycled in a 2016 coin cell using lithium metal as a counter electrode. An equivolume mixture of ethylene carbonate and dimethyl carbonate (EC DMC) with $LiPF_6$ was used as the electrolyte. A 0.50 mm thick strip of fiberglass was used as a separator. A polyethylene separator was used in the bulk germanium cell. Electrochemical tests were performed using an Arbin Instruments BT2000 battery cycler. Transmission electron microscopy (TEM) was performed using a Philips EM 420 operated at 100 kV. TEM samples were prepared by physical vapor deposition onto a holey carbon grid. X-ray diffraction (XRD) was performed with an Inel CPS-120 diffractometer using Co Kα radiation ($\lambda$=1.790 Å). The as-deposited samples were prepared on glass substrates and the diffraction data were acquired in air. The lithiated electrodes were prepared by discharging an electrochemical cell to a potential of 0 V. The electrodes were extracted from the cells in an argon glove box, where the specimens were mounted on glass and covered with polyimide (Kapton®, Dupont) to prevent air contamination. The amorphous background produced by the sample holder (e.g., glass and Kapton®) was measured and subtracted from each of the diffraction patterns.

Some of the analysis of X-ray diffraction (XRD) data was performed as described in B. Fultz and J. Howe, *Transmission Electron Microscopy and Diffractometry of Materials*, Springer-Verlag:New York; 2000, the disclosure of which is incorporated by reference.

EXAMPLE 1

Synthesis of Germanium Nanoparticles by Inert Gas Condensation and Ballistic Consolidation Germanium nanocrystalline clusters were prepared by inert gas condensation and ballistic consolidation in the apparatus illustrated in FIG. 1. The gas stream was a forming gas composed of 90% Ar and 10% $H_2$ with a pressure differential of $2\times10^{-3}$ torr between the inlet port 110 and the outlet port 120. An elemental germanium charge was heated to about 1600° C. in a tungsten wire basket 130. The evaporated atoms cool quickly in the forming gas and thereby nucleate nanoscale crystallites within the gas. The gas-phase ballistic deposition of the entrained nanoparticles produces a "web" of nanocrystalline aggregates on the substrate 160.

A variety of substrates was used in the depositions. Nanocrystalline germanium particles were deposited onto carbon fiber substrates (about 10 μm diameter). These substrates provided high-surface-area conductive substrates for electrochemical cells. Other electrodes were deposited on nickel- or copper-coated planar substrates prepared as follows. First, the surface of a 2016 stainless steel coin cell was roughened using 400 grit sandpaper. Next, a thin nickel or copper coating (about 100 nm) was then evaporated on the surface and finally, the germanium nanocrystals were deposited onto the nickel or copper-coated planar substrate.

EXAMPLE 2

Synthesis of Germanium Thin Films by Physical Vapor Deposition

Nanostructured germanium films were prepared by evaporation and physical vapor deposition. A charge of elemental germanium (99.999+%) was evaporated under a vacuum of $2\times10^{-6}$ torr in a tungsten wire heating basket. A nickel/copper substrate was placed directly below the tungsten basket, and the evaporated germanium atoms were deposited onto the substrates in a thin film.

EXAMPLE 3

Characterization of Ballistically Deposited Germanium Nanoparticles

Figure 4:
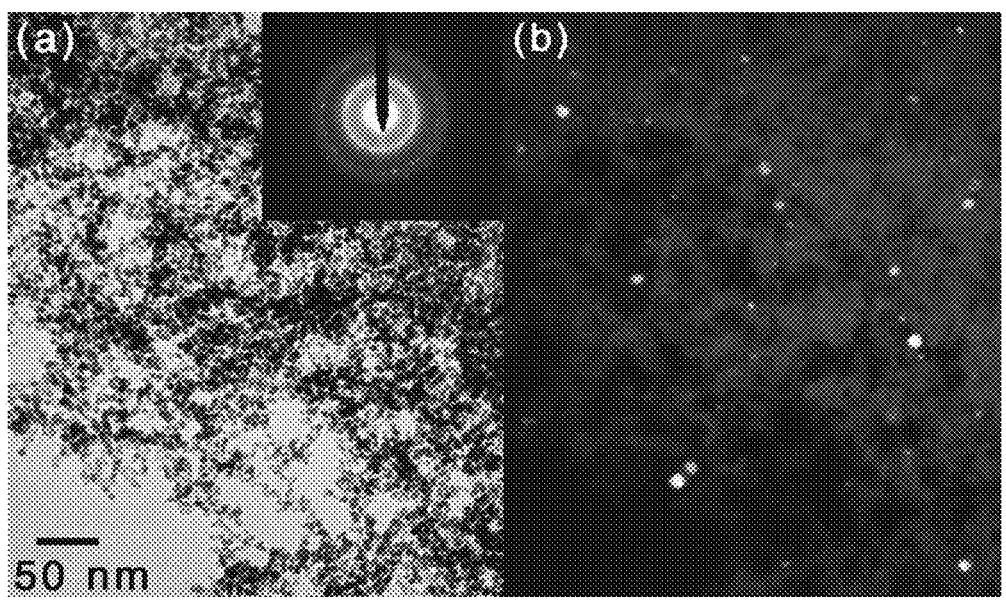
FIG. 4A is a bright-field TEM image of ballistically deposited germanium showing an agglomeration of nanocrystals. The electron diffraction pattern is displayed in the inset.
FIG. 4B is a dark-field TEM image of ballistically deposited germanium showing an agglomeration of nanocrystals.

Bright and dark-field TEM images of a sample germanium film prepared by ballistic consolidation as described in EXAMPLE 1 are provided in FIG. 4A and FIG. 4B, respectively. The dark-field images were created using the (111) diffraction ring. The film appears to consist of a web of interconnected nanocrystalline germanium particles with a mean particle diameter of about 10 nm. The distinct bright spots in the electron diffraction pattern displayed in the inset of FIG. 4A indicate a crystalline structure.

EXAMPLE 4

Characterization of Germanium Thin Films

Figure 5:
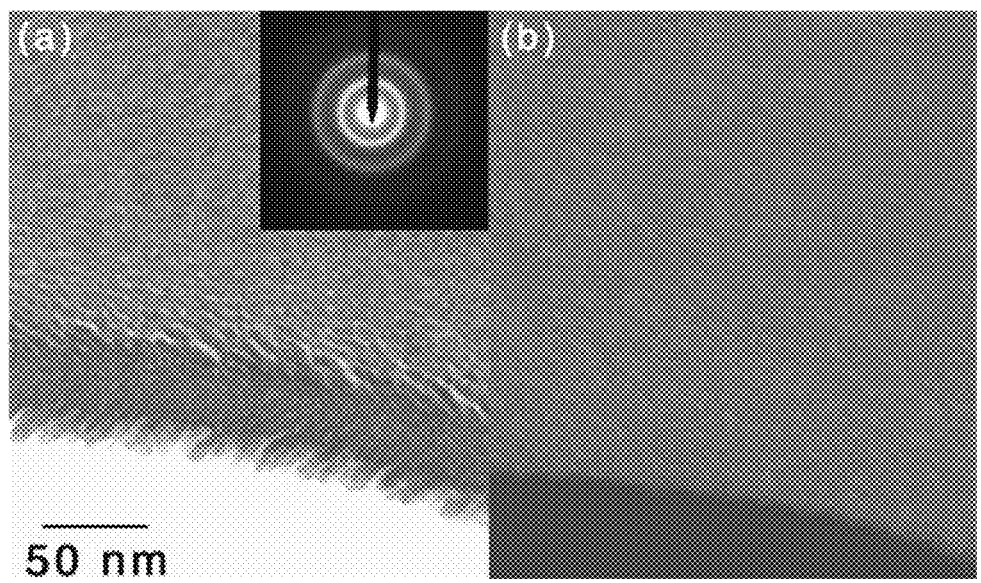
FIG. 5A is a bright-field TEM image of an amorphous thin film of evaporated germanium. The electron diffraction pattern is displayed in the inset.
FIG. 5B is a dark-field TEM image of an amorphous thin film of evaporated germanium.

Evaporated germanium prepared as described in EXAMPLE 2 formed a continuous thin film as seen in the bright-field and dark-field TEM images provided in FIG. 5A and FIG. 5B, respectively. The broad rings of the electron diffraction pattern displayed in the inset of FIG. 5A suggest the material is entirely amorphous. In the middle of the film, the material appears to be contiguous and uniform, while the material on the edge of the holey carbon substrate appears to have a columnar structure. It is believed that the structure of the material on the substrate edge is an artifact.

EXAMPLE 5

Characterization of Cycled Germanium Electrodes

Figure 6:
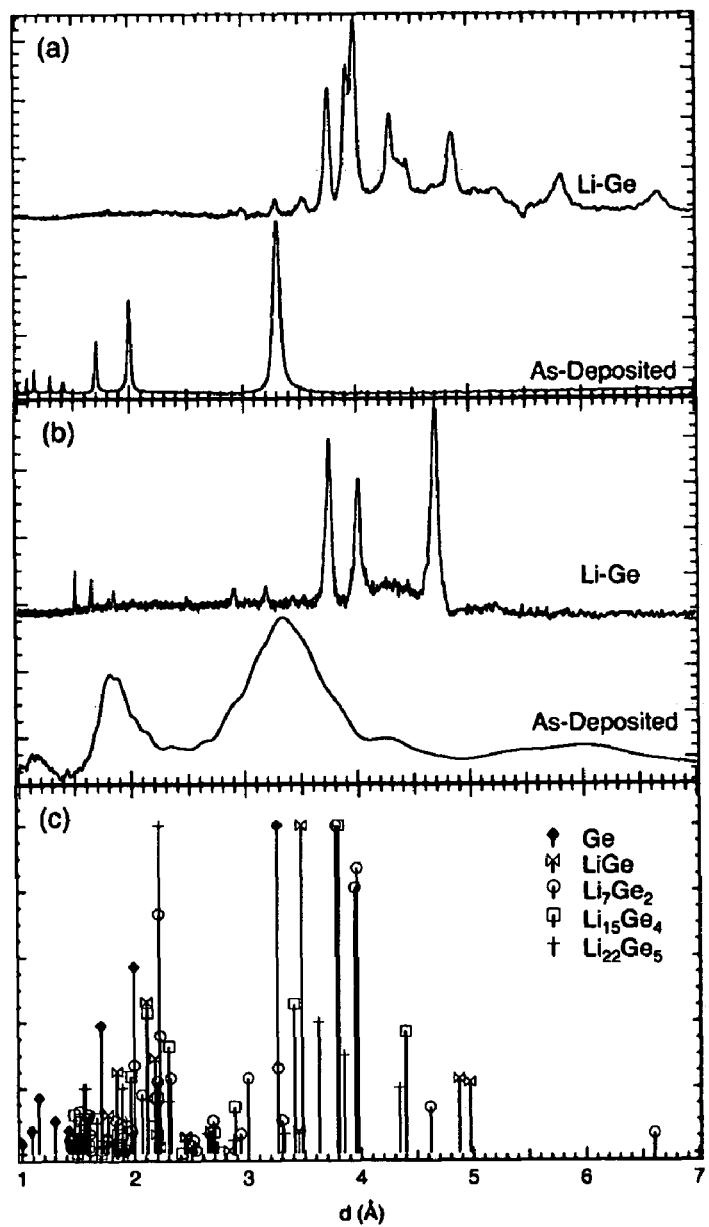
FIG. 6A is an XRD pattern of a ballistically deposited germanium sample before and after electrochemical lithiation.
FIG. 6B is an XRD pattern of an evaporated germanium sample before and after electrochemical lithiation.
FIG. 6C illustrates calculated peak positions for pure germanium and some Li—Ge phases.

FIG. 6A provides XRD patterns from ballistically deposited germanium samples before and after electrochemical lithiation. The peak positions of the as-deposited material are consistent with the diamond cubic structure with a lattice parameter of a=5.66 Å. The broad peaks of the as-deposited material indicate a small crystallite size, which was estimated using the approximate Scherrer equation to be about 12 nm. The XRD pattern from the ballistically deposited material after electrochemical lithiation contains a number of Bragg peaks at large d-spacings, indicating that the material is at least partially crystalline. Large interplanary spacings are expected for most of the Li—Ge phases.

XRD patterns of evaporated germanium nanofilm samples before and after lithiation are provided in FIG. 6B. The broad peaks of the as-deposited material confirm that the material is initially amorphous, while the sharp peaks from the lithiated electrode suggest at least some crystalline Li—Ge phases.

Peak positions for elemental germanium as well as for a number of Li—Ge phases are provided in FIG. 6C. Crystallographic phases of the Li—Ge system are described in E. Menges, V. Hopf, H. Schaefer, and A. Weiss, *Z. Naturforsch. B*, 24:1351, 1969; U. Frank and W. Muller, *Z. Naturforsch. B*, 30:313, 1975; V. Hopf, H. Schafer, and A. Weiss, *Z Naturforsch. B*, 25:653, 1970; V. Hopf, *Z. Naturforsch. B*, 27:1157, 1972; Q. C. Johnson, G. S. Smith, and D. Wood, *Acta. Crystallogr.*, 18:131, 1965; and E. I. Gladyshevskii, G. I. Oleksiv, and P. I. Kripyake, *Soy. Phys. Crystallogr.*, 9:269, 1964, the disclosures of which are incorporated by reference.

The peaks in the Li—Ge diffraction patterns of FIG. 6A and FIG. 6B correspond to a number of crystallographic phases, which suggests that the framework materials are heterogeneous in the lithiated state. The most obvious of these phases include LiGe, $Li_7Ge_2$, and $Li_{15}Ge_4$. Other phases that may be present include $Li_{11}Ge_6$, $Li_9Ge_4$, and $Li_{22}Ge_5$. The broad underlying peaks at 2.2 Å and 4.5 Å suggest an amorphous phase in the lithiated material.

EXAMPLE 6

Capacity of Nanostructured Germanium Electrodes

Figure 7:
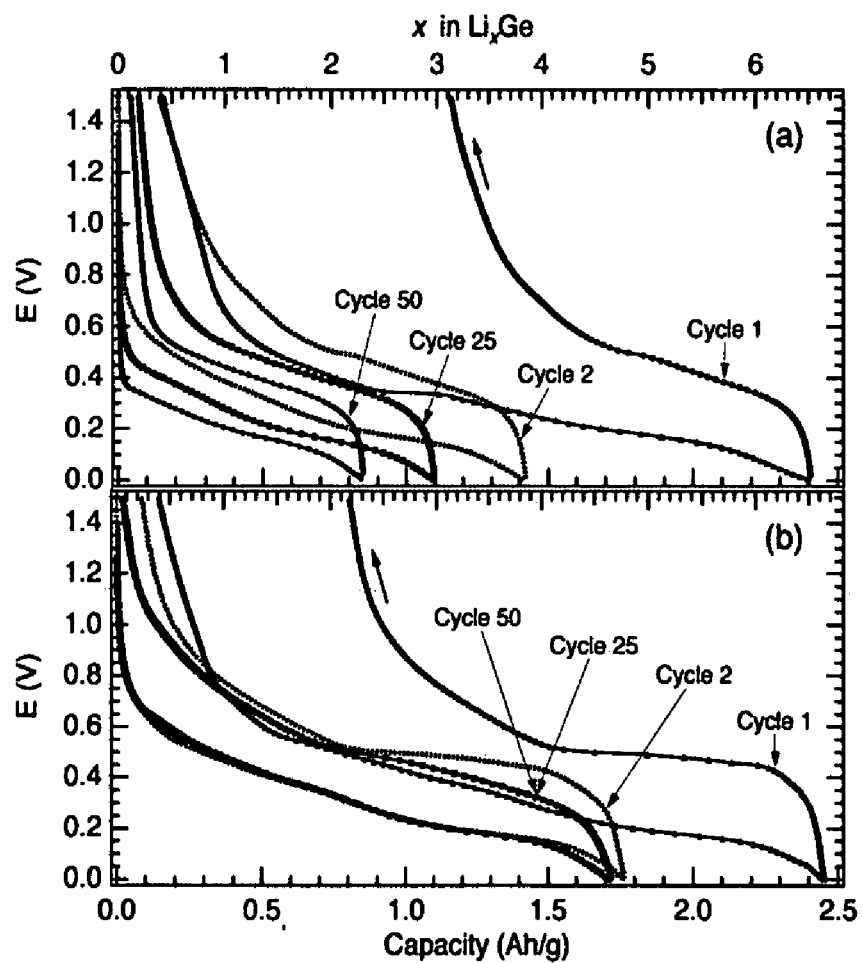
FIG. 7A is a voltage profile from a ballistically deposited germanium sample.
FIG. 7B is a voltage profile from an evaporated germanium sample. Arrows indicate the charge step of the first cycle.

A plot illustrating voltage profiles from a 236 μg electrode of a ballistically deposited nanocrystalline germanium sample and a 42 μg electrode of an evaporated germanium nanofilm sample are provided in FIG. 7A and FIG. 7B, respectively. Note the high reversible capacity of the nanostructured electrodes. The evaporated germanium nanofilm electrode accommodates about 4.5 lithium atoms per germanium atom, which is slightly higher than the theoretical stoichiometry for crystalline $Li_{22}Ge_5$. The film thickness is estimated to be 60 nm based upon the electrode mass and bulk material density. Thicker films of up to 250 nm (180 μg) were cycled at slower rates with similar results. The ballistically deposited material hosts up to about 3.8 lithium atoms per germanium atom.

Figure 8:
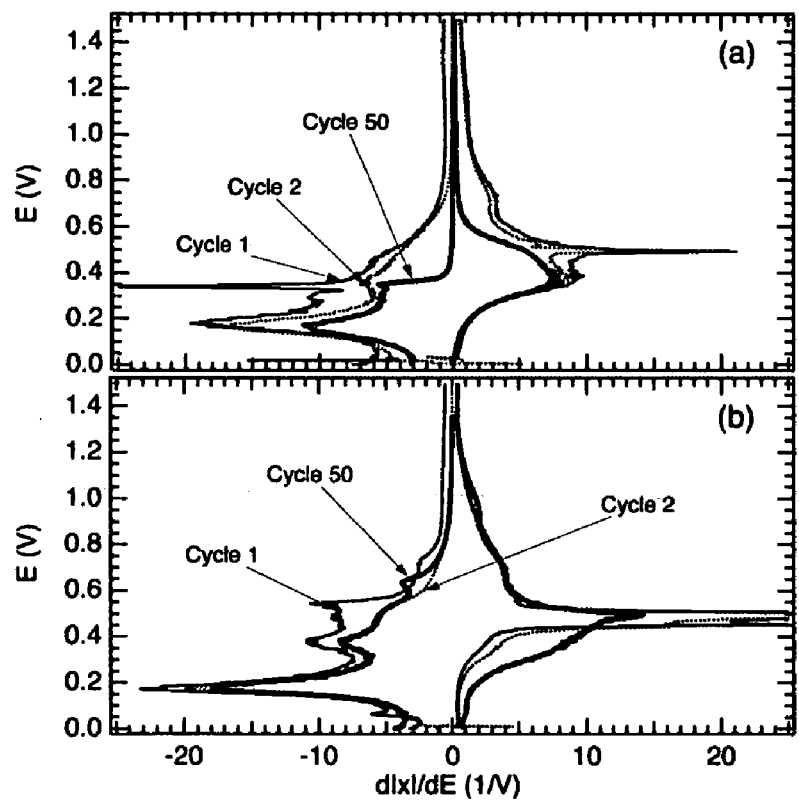
FIG. 8A is a plot of the differential capacity from a ballistically deposited germanium sample.
FIG. 8B is a plot of the differential capacity from an evaporated germanium sample.

The differential capacity, d|x|/dE, for the ballistically deposited nanocrystalline germanium electrode and the evaporated germanium nanofilm electrode is provided in FIG. 8A and FIG. 8B, respectively. In these graphs, x is the lithium stoichiometry in $Li_xGe$, and E is the cell potential. A peak indicates an equipotential site for lithium insertion in the material. The dual peaks exhibited in these plots indicate that at least two new phases are formed during lithium insertion/extraction at 180 mV/380 mV and 360 mV/500 mV. It is believed that the disparity between the potentials for lithium insertion and extraction arises from an over potential resulting from the constant current, or nonequilibrium state. The approximate actual phase transition energy is the average of the charge and discharge values, providing potentials of about 280 mV and about 430 mV at room temperature.

A number of phase transitions are expected to occur during lithiation at room temperature according to the Li—Ge phase diagram. Phase transitions are identified by plateaus in the voltage profile (FIG. 7A and FIG. 7B). The Gibbs phase rule prohibits any variation in the chemical potential (or cell voltage) at fixed temperature when two simultaneous phases are present. Consequently, in a two-phase region, the potential is constant during changes in lithium concentration as one phase grows at the expense of the other. The voltage profiles provided in FIG. 7A and FIG. 7B exhibit reasonably smooth slopes on the charge and discharge cycles for each of the nanostructured electrodes. However, subtle variations in the slope suggest the formation of a new phase. The differential capacity plots provided in FIG. 8A and FIG. 8B accentuate changes in the slope of the potential curves. Peaks in the differential capacity indicate regions of the potential where lithium ions are entering nearly equipotential sites. The presence of multiple peaks suggests that a number of different Li—Ge phases are formed during electrochemical lithiation in both the evaporated and ballistically-deposited electrodes. This behavior contrasts with silicon, which forms amorphous phases upon lithiation at room temperature, for example, as described in P. Limthongkul, Y. I. Jang, N. Dudney, and Y. M. Chiang, *Acta Materialia*, 51:1103-1113, 2003, the disclosure of which is incorporated by reference.

The large irreversible capacity observed in FIG. 7A and FIG. 7B on the initial cycle is likely attributed to the formation of a surface-electrolyte interphase (SEI). A reaction of lithium with the electrolyte accompanies the initial lithiation of the germanium electrode, forming a passivation layer or SEI. This formation of a passivation layer is beneficial when using a carbon electrode because it prevents solvent cointercalation during lithiation. Lithium alloy electrodes are not affected by solvent cointercalation, however, and a passivation layer provides no benefit. In the illustrated embodiments of the nanostructured electrodes, the SEI layer does not appear to be detrimental to the specific capacity or cycle life, however. The first cycle capacity loss is approximately 70% of what was observed in similar nanostructured Li—Si materials. The lower first-cycle irreversible capacity may be attributed to the lack of a native oxide on germanium, which might otherwise contribute to the SEI if it were reduced by lithium.

EXAMPLE 7

Cycle Life of Nanostructured Germanium Electrodes

Figure 9:
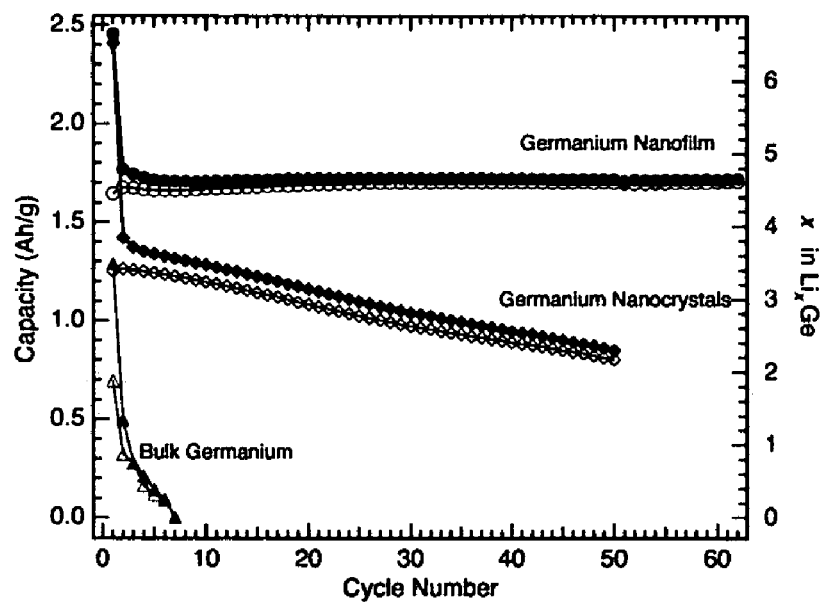
FIG. 9 illustrates the cycle life of a ballistically deposited nanocrystals germanium sample, an evaporated amorphous germanium nanofilm sample, and a control sample of bulk crystalline germanium. The light and shaded markers represent the charge and discharge cycles, respectively.

FIG. 9 provides plots of the cycle life for samples of bulk crystalline germanium (grain size ≦38 μm) and the two types of nanostructured germanium electrodes. The nanostructured electrodes were cycled at a rate of about C/4 (i.e., 375 mA/g) between 0 and 1.5 V, whereas the bulk electrode was cycled at a much slower rate (about C/30) to maximize the specific capacity. Despite the gentle cycling conditions, bulk germanium exhibited a poor cycle life, with nearly complete capacity loss by the seventh cycle. The evaporated germanium nanofilm exhibits a large first-cycle irreversible capacity with a steady specific capacity of 1.7 Ah/g and no detectable capacity fade over 60 cycles. A similar first-cycle capacity loss is observed with the ballistically deposited germanium. Although the initial stable capacity is similar to that of the evaporated nanofilm (about 1.4 Ah/g), the ballistically deposited electrode exhibits a constant capacity fade of about 0.01 Ah/g per cycle.

As illustrated in FIG. 9, the high specific capacities of the nanostructured germanium electrode samples were stable for over 50 cycles. High capacities are expected because of the high solubility of lithium in germanium. Nevertheless, the complete lithiation of germanium has not previously been observed at room temperature on the observed time scales. The volumetric change in germanium on complete lithiation ($Li_{4.4}Ge$) is up to about 230% as described in R. Nesper, *Prog. Solid State Chem.*, 20:1-45, 1990, the disclosure of which is incorporated by reference. The slow diffusion of lithium into germanium is expected to create large stresses within the material arising from this change in volume, thereby causing the decrepitation of the host, which is believed to cause the relatively poor cycle life for the bulk germanium electrode illustrated in FIG. 9. In contrast, there is little or no capacity loss observed in the amorphous nanofilm sample over 62 cycles. Similarly, the nanocrystalline sample exhibits only a slow loss of capacity over 50 cycles. These results suggest that the nanostructured germanium materials do not decrepitate significantly during electrochemical cycling. Our current belief is that the constant capacity loss observed in the nanocrystalline system arises from the spallation of particles from the surface of the current collector, which results from volumetric changes in the sample of up to 230% during cycling.

The stability of the amorphous nanofilm sample during cycling is surprising. Although this electrode is thin, suggesting rapid lithium transport perpendicular to the film, the electrode is formed on a rigid substrate. The 230% volume expansion that occurs during lithiation is expected to create large strain gradients as the lithium front propagates in and out of the film. Such strains are expected to be sufficient to debond the film from the substrate. Complete decohesion of the film from the substrate is not observed during cycling, however, and the film apparently remains electrically intact. Despite the electrical continuity, it is likely that cracks are generated during the initial cycling and the propagation of these cracks partitions the film into isolated islands. It is believed that these islands are able to accommodate the volume changes of cycling while maintaining contact with the current collector. Although the film is broken, it is believed that the cell does not lose capacity because the material does not decrepitate or spall off the surface as it does for electrodes made of bulk germanium.

The cycling stability of lithium in the ballistically deposited germanium is believed to be attributable to an absence of conventional mechanisms for microstructural damage in nanoscale materials, for example, as described in J. Graetz, C. C. Ahn, R. Yazami, and B. Fultz, *Electrochem. Solid State Lett.*, 6:A194-A197, 2003, the disclosure of which is incorporated by reference. The formation and propagation of cracks is prohibited due to the absence of dislocations and the large critical flaw size for crack growth, with respect to the particle diameter. The reduced particle decrepitation is also attributable to the short time scales required for the relaxation of diffusional stresses in nanostructured materials. The relaxation time is proportional to the square of the diffusion distance. The diffusion of lithium into the host distorts the lattice parameter, a, to approximately $3^{1/3}a$. The strain is not intrinsically harmful to the host, but rather it is the gradients in strain that are responsible for breaking apart the electrode during cycling. When the diffusion lengths are short, the relaxation times are short and the material is strained uniformly.

The reversible cycling of 4.5 lithium atoms per germanium atom in the amorphous thin film and 3.8 lithium atoms per germanium atom in the nanocrystalline film are considerably larger than the reversible capacities measured in analogous nanocrystalline silicon materials. Silicon electrodes prepared and cycled under similar conditions exhibited reversible capacities of 2.1 lithium atoms per silicon atom in the amorphous thin film and 1.1 lithium atoms per silicon atom in the nanocrystalline film. The larger reversible lithium uptake in the germanium system is attributable in part to the higher diffusivity, D, of lithium in germanium at room temperature ($D_{Ge} \approx 400\ D_{Si}$). In addition, the 25 Å native oxide on the surface of the silicon electrode reduces the overall specific capacity, increases the first cycle irreversible capacity, and contributes to the SEI, which ultimately increases the cell impedance.

EXAMPLE 8

Kinetics of Nanostructured Germanium Electrodes

The rate capabilities of the nanostructured electrodes were also investigated. A 250 nm evaporated germanium film (180 µg) was cycled at a constant discharge rate of 0.5 C and a variable charge rate from 0.5 C to 1000 C. At 0.5 C the cell was cycled between 0 V and 1.5 V and the upper limit of the potential was increased by 50-100 mV on each subsequent cycle to account for the over potential associated with the increased cycling rates. A ballistically deposited nanocrystalline film (314 µg) was cycled under similar conditions.

Figure 10:
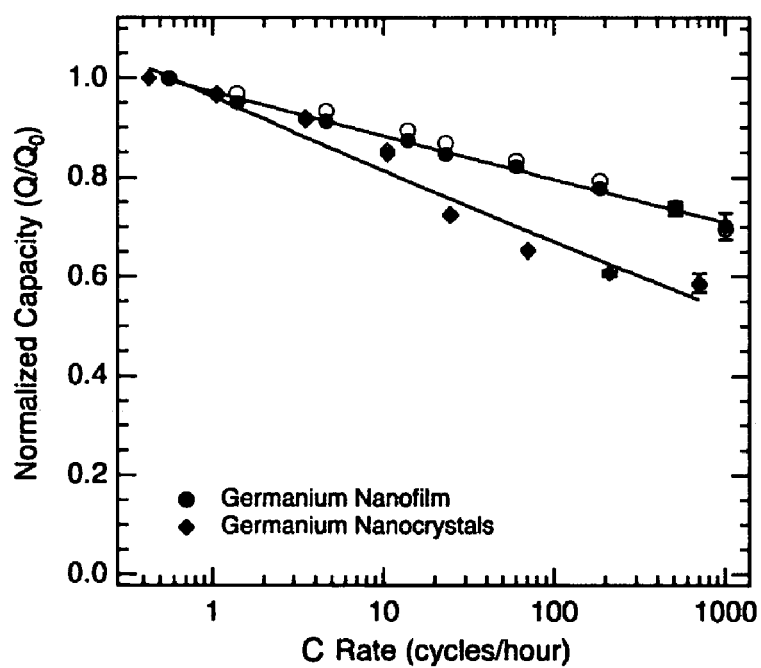
FIG. 10 is a graph of the rate capabilities of a ballistically deposited germanium sample and an evaporated thin film sample. The electrodes were lithiated (discharged) at a constant rate of 1 C and delithiated (charged) at a variable rate. The light and shaded markers represent the charge and discharge cycles, respectively.

FIG. 10 is a plot of the normalized capacity ($Q/Q_0$) for these samples at various discharge rates. The vertical error bars reflect the uncertainty associated with the data acquisition system and are visible only when the charging times are short. Remarkably, only a moderate capacity loss is observed between 1 C and 1000 C.

Figure 11:
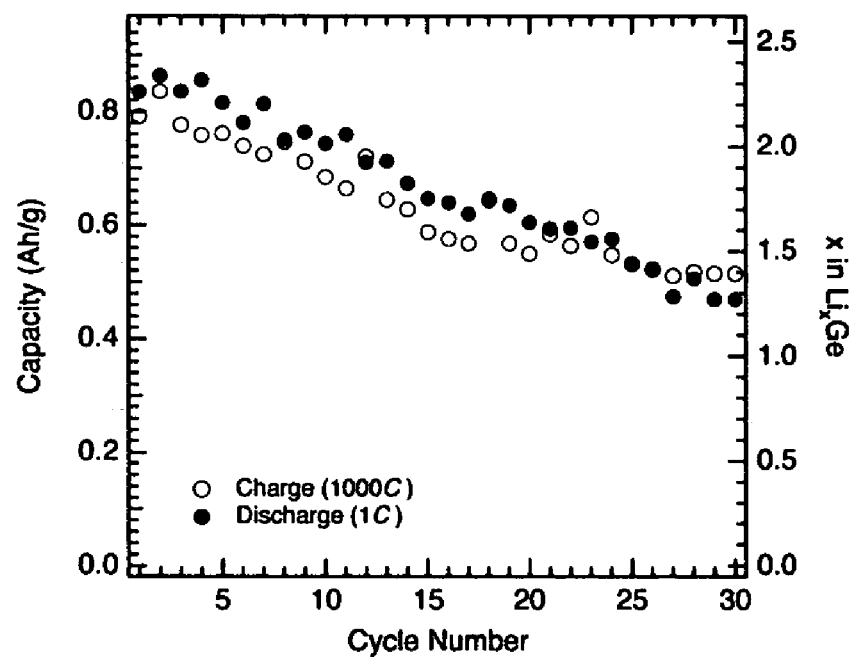
FIG. 11 is a graph of the cycle life of a thin film amorphous germanium sample at a lithiation rate of 1 C and a delithiation rate of 1000 C. The light and shaded markers represent the charge and discharge cycles, respectively.

A test of the cycle life at high rates was also performed on the amorphous thin-film electrode. In this experiment the 250-nm germanium film was cycled at a discharge rate of 0.5 C and a charge rate of 1000 C, where a rate of nC corresponds to 1624/n mA/g-Ge. The cell was cycled between 0 V and 3.0 V. FIG. 11 is a plot of the charge and discharge capacities over 30 cycles. The observed overlap between the high-rate charge step and low-rate discharge step indicates that substantially all of the lithium inserted over a four-hour lithiation period is removed in less than four seconds upon delithiation.

The capacities measured at variable charging rates (FIG. 10) indicate a slow exponential (linear on a log scale) capacity decay up to 1000 C. There is no indication of a catastrophic loss of capacity typically associated with an electrochemical cell limited by solid state diffusion. The voltage profiles at 1000 C are similar to those at 0.5 C, indicating that the lithium is alloyed with the host and not simply plated on the electrode surface.

EXAMPLE 9

Silicon-Germanium Thin Films

Germanium-silicon thin films were deposited as described in EXAMPLE 2 for germanium using elemental silicon and germanium. The stoichiometries of the silicon and germanium starting materials were as follows: $Si_{0.25}Ge_{0.75}$, $Si_{0.5}Ge_{0.5}$, and $Si_{0.75}Ge_{0.25}$. The appearances of the silicon-germanium thin films were similar to the germanium thin films deposited according to EXAMPLE 2.

Capacities for the silicon-germanium thin films were approximately the weighted averages of the individual capacities for pure silicon and germanium, i.e., for $Si_{(1-z)}Ge_z$ $$Q_{Si_{(1-z)}Ge_z} = (1-z)Q_{Si} + zQ_{Ge} \qquad \text{Eq. 2}$$

Figure 12:
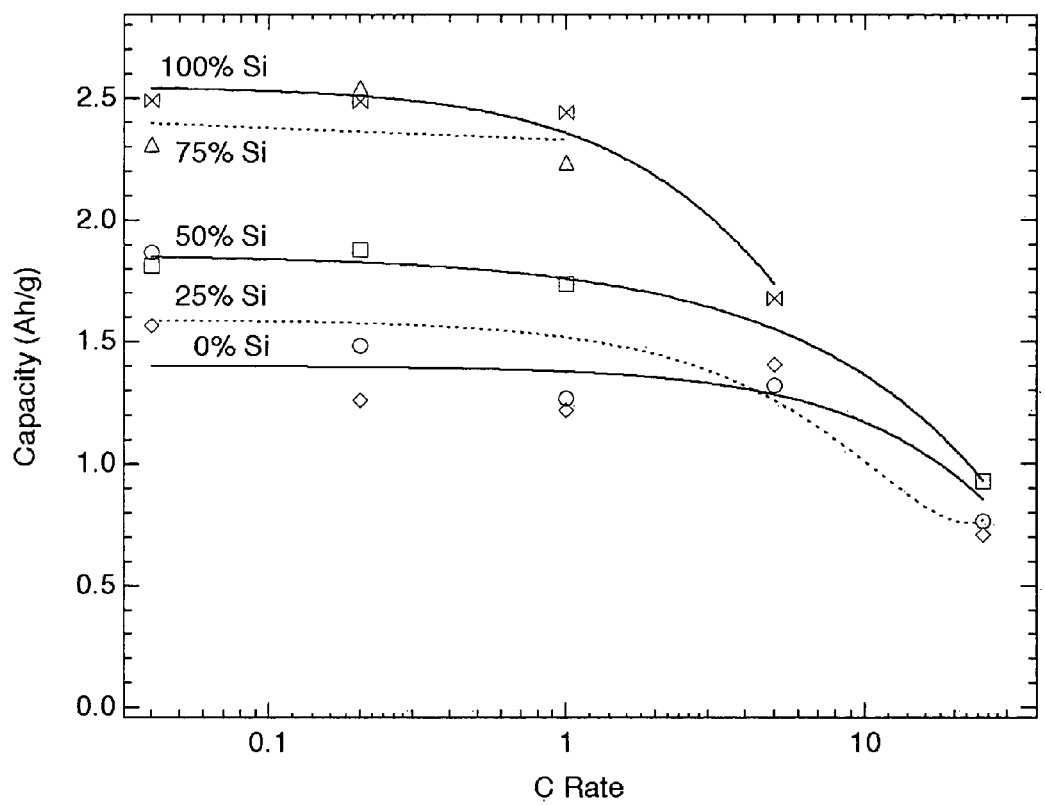
FIG. 12 is a plot illustrating the capacity vs. cycle rate for $Si_{(1-z)}Ge_z$ for z=0, 0.25, 0.5, 0.75, and 1.

This capacity behavior suggests that the films are solid solutions of silicon and germanium. A plot of the capacity vs. cycle rate for $Si_{(1-z)}Ge_z$ for z=0 (▷◁), 0.25 (Δ), 0.5 (□), 0.75 (○), and 1 (◇) is provided in FIG. 12. These results indicate that in some embodiments, the capacity of an electrode is enhanced by increasing the silicon content. Similarly, in some embodiments, the cycling rate of an electrode is enhanced by increasing the germanium content. In some embodiments, the cycle life on an electrode is enhanced by increasing the germanium content. Consequently, in some embodiments, a combination of some or all of these electrode characteristics is optimized by adjusting the silicon-germanium stoichiometry.

The embodiments illustrated and described above are provided as examples of certain preferred embodiments. Various changes and modifications can be made to the embodiments presented herein by those skilled in the art without departure from the spirit and scope of this disclosure.

What is claimed is:

1. An electrode for a secondary electrochemical cell, the electrode comprising a substrate and a layer of nanostructured framework material which adheres to the substrate, the framework material being in the form of an amorphous nanofilm of substantially pure silicon-germanium material having a purity of greater than about 90% of formula $Si_{(1-z)}Ge_z$, wherein z is from 0.25 to 0.75 and wherein the electrode is the anode of a secondary electrochemical cell comprising an anode, a cathode and an electrolyte, the framework material of the electrode being disposed to allow interaction with the electrolyte.

2. The electrode of claim 1 wherein the framework material is alloyed with an alkali metal.

3. The electrode of claim 1, wherein the nanofilm has a thickness of not greater than about 500 nm.

4. The electrode of claim 3, wherein the nanofilm has a thickness of not greater than about 200 nm.

5. The electrode of claim 4, wherein the nanofilm has a thickness of not greater than about 100 nm.

6. The electrode of claim 2, wherein the alkali metal is lithium and the lithium alloy of the nanostructured material has the formula $Li_xSi_{(1-z)}Ge_z$, wherein x is at least about 1.

7. The electrode of claim 6, wherein the lithium alloy of the nanostructured material has the formula $Li_xSi_{(1-z)}Ge_z$, wherein x is at least about 2.5.

8. The electrode of claim 1, wherein the nanostructured material has a cycle life that is stable over at least about 10 cycles.

9. The electrode of claim 8, wherein the nanostructured material has a cycle life that is stable over at least about 20 cycles.

10. The electrode of claim 1, wherein the nanostructured material exhibits a rate capability of at least about 1 C.

11. The electrode of claim 1, wherein the substrate is a current collector and is made from a metal.

12. The electrode of claim 1 wherein z is from 0.5 to 0.75.

13. The electrode of claim 1, wherein the substrate serves as a current collector.

14. The electrode of claim 1, wherein the silicon-germanium material is a solid solution of silicon and germanium.

15. The electrode of claim 1, wherein the silicon-germanium material is not homogeneous.

16. An electrode for a secondary electrochemical cell, the electrode comprising an alkali metal alloy of nanostructured silicon-germanium material of formula $Si_{(1-z)}Ge_z$ wherein z is from 0.25 to 0.75, the alkali metal alloy being produced by electrochemically alloying an alkali metal with an amorphous nanofilm of the material of formula $Si_{(1-z)}Ge_z$ and wherein the electrode is the anode of a secondary electrochemical cell comprising an anode, a cathode and an electrolyte, the alkali metal alloy of the electrode nanofilm being disposed to allow interaction with the electrolyte.

17. The electrode of claim 16, where the thickness of the nanofilm is no greater than 500 nm.

18. The electrode of claim 16 wherein the alkali metal is lithium.

19. The electrode of claim 16, wherein the silicon-germanium material is a solid solution of silicon and germanium.

20. The electrode of claim 16, wherein the silicon-germanium material is not homogenous.

21. The electrode of claim 16, wherein the alkali metal is lithium and the lithium alloy has the formula $Li_xSi_{(1-z)}Ge_z$, wherein x is at least about 1.

* * * * *